United States Patent [19]

Marek

[11] Patent Number: 4,714,263

[45] Date of Patent: Dec. 22, 1987

[54] AXLE OSCILLATION ADJUSTMENT MEANS

[75] Inventor: Donald C. Marek, Hickory Hills, Ill.

[73] Assignee: J. I. Case Company, Racine, Wis.

[21] Appl. No.: 908,391

[22] Filed: Sep. 17, 1986

[51] Int. Cl.$^4$ .................... B60G 11/22; B60G 11/00; B60G 25/00

[52] U.S. Cl. ................................ 280/111; 180/89.1; 180/900; 180/905

[58] Field of Search .................. 180/312, 89.1, 306, 180/307, 900, 905, 89.1; 280/111, 716

[56] References Cited

U.S. PATENT DOCUMENTS

| | | | |
|---|---|---|---|
| 1,684,302 | 9/1928 | Arndt | 280/111 |
| 1,765,764 | 6/1930 | Jett | 280/111 |
| 2,560,144 | 7/1951 | Voorhees | 280/111 |
| 3,365,212 | 1/1968 | Powers | 280/111 |
| 3,805,908 | 4/1974 | Thompson | 180/89.1 |
| 4,128,255 | 12/1978 | Goldren | 280/111 |
| 4,168,844 | 9/1979 | Smith | 280/111 |
| 4,403,671 | 9/1983 | Schmahl | 280/111 |
| 4,492,366 | 1/1985 | Ozawa et al. | 180/312 |
| 4,500,113 | 2/1985 | Law | 280/716 |
| 4,546,848 | 10/1985 | Iijima et al. | 180/312 |
| 4,580,801 | 4/1986 | Suketomo et al. | 180/312 |

Primary Examiner—Richard A. Bertsch
Attorney, Agent, or Firm—Peter N. Jansson, Ltd.

[57] ABSTRACT

An improved tractor axle oscillation limiter of the type projecting upwardly on the axle structure to engage a fixed bolster on the tractor. The device includes a base having a first top abutment surface, and a mounted member securable to the base in working position with a second top abutment surface positioned above the first. The mounted member is preferably also securable to the base in a storage position.

19 Claims, 8 Drawing Figures

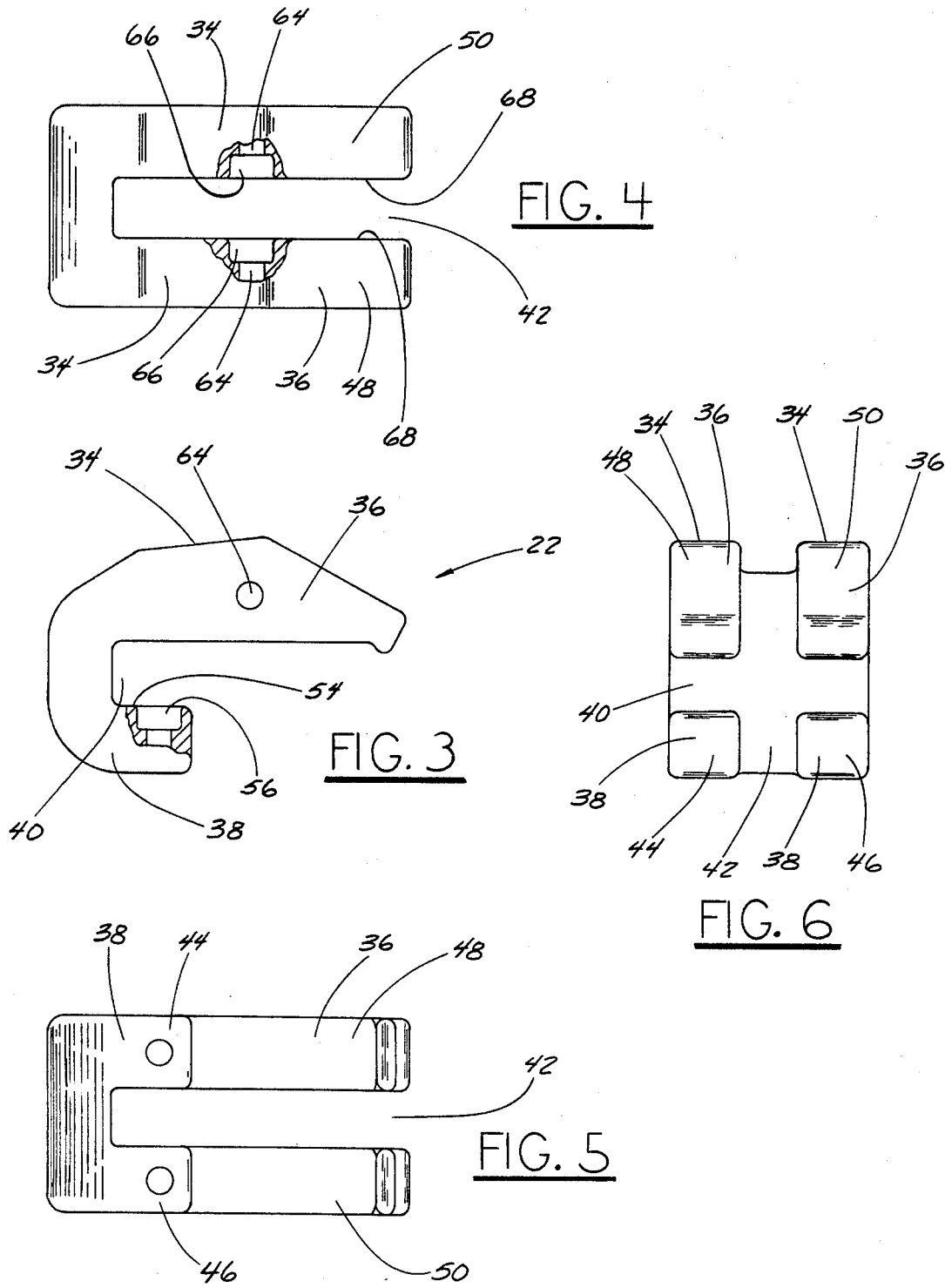

AXLE OSCILLATION ADJUSTMENT MEANS

FIELD OF THE INVENTION

This invention is related generally to axle mounts and supports for tractors and, more particularly, to axle oscillation limiting devices.

BACKGROUND OF THE INVENTION

A substantial angle of oscillation of an axle, such as the front axle of a tractor, is usually desirable to provide good vehicle stability on rough ground. When the terrain is quite irregular oscillation of such tractor axle allows the tractor wheels to remain infirm contact with the ground to give the tractor good support.

It is necessary, of course, to limit the angle of axle oscillation such that the tractor tires do not contact portions of the tractor body. Tractors, therefore, have axle stops on their axle housings, and abutment members (sometimes called "bolsters") in fixed position above their axles to be engaged by the axle stops as the axle pivots well away from its normal horizontal orientation.

While a substantial angle of axle oscillation is desirable for stability, in some cases it is desirable to restrict the maximum angle of oscillation. For any given set of tractor wheels and tires, a further restriction in the maximum angle of axle oscillation increases the maximum turning angle which is achievable before the tractor tires hit the body of the tractor. That is, limiting the angle of axle oscillation shortens the turning radius of the tractor, making it more maneuverable.

Tractor maneuverability is very important in a number of tractor uses. For example, feed lot work requires substantial maneuverability in a situation in which instability due to uneven ground is rarely a problem. Therefore, restriction of the angle of axle oscillation is highly desirable.

In some cases the use of large front wheels and tires on a tractor is desirable. For example, when a tractor has a mechanical front-wheel drive larger wheels and tires are highly desirable. When the axle pivots, larger tires tend to hit the tractor body more easily, that is, during smaller turns. Therefore, greater restriction of the angle of maximum axle oscillation tends to allow the use of tractor tires which are either greater in diameter or wider in tread width, or both.

Given the number of tasks for which tractors are used, it is sometimes desirable to change the maximum angle of axle oscillation to adapt the tractor to the immediate task. In some cases this means increasing the maximum angle of axle oscillation and in other cases it means decreasing such maximum angle.

Various devices have been used in the past to limit and in some cases change the angle of axle oscillation. The prior art includes limiting means of various kinds, including those disclosed in the following patents: U.S. Pat. Nos. 1,765,764 (Jett); 4,500,113 (Law); 3,805,908 (Thompson); and 2,560,144 (Vorhees). The prior art also includes the use of crude devices, such as bolts holding a series of washers, to further restrict the angle of axle oscillation.

While various axle oscillations stop means have been disclosed in the prior art, there is a need for an accessible, easily installable and easily adjustable device for further limiting the maximum angle of axle oscillation in tractors.

OBJECT OF THE INVENTION

It is an object of this invention to provide an axle oscillation adjustment means overcoming some problems and shortcomings of the prior art.

Another object of this invention is to provide a tractor oscillation limiter which is easy to install and easy to remove and adjust.

Another object of this invention is to provide an auxiliary stop means for limiting the extent of axle oscillation which may be kept readily accessible for easy installation when further oscillation limitation is desirable.

Another object of this invention is to provide an axle oscillation adjustment means readily adjustable to accommodate the conversion of a tractor into a mechanical front drive tractor.

These and other important objects will be apparent from the descriptions of this invention which follow.

SUMMARY OF THE INVENTION

This invention is an improved tractor axle oscillation limiter of the type including an upwardly-projecting stop on the tractor axle structure positioned to engage a bolster located in a fixed position on the tractor above the axle. The invention overcomes some deficiencies in oscillation stops of the prior art by providing an easily accessible and easily mountable pair of auxiliary stop structures to impose a further limitation on the maximum angle of possible axle oscillation, particularly a tractor front axle.

As in the prior art, a stop is located on either side of the center of the axle as a part of or on top of the axle structure. Each of the two stops on a tractor axle limits axle oscillation in one direction about the midpoint of the axle.

Each stop of this invention has two principal members—a base which is fixed with respect to the main axle structure, and an auxiliary member (or "mounted member") which is removably securable to the base.

The base, which is preferably integrally formed with the axle housing, has a first top abutment surface configured and positioned to engage its counterpart bolster in fixed position on the tractor above the axle. The mounted member has a second top abutment surface which is also configured to engage the bolster. When the mounted member is secured to the base in a working position, the second top abutment surface is above the first top abutment surface, positioned for bolster engagement such that it restricts oscillation of the axle more than the first abutment surface.

The mounted member is preferably secured to the base by screw means extending through the mounted member and having a distal end contacting the base. This allows easy attachment and detachment of the mounted member with respect to the base.

The mounted member preferably includes a recess which nonrotatably receives a nut or other female threaded member and the screw means includes a male threaded member (bolt) extending through the mounted member and through the female threaded member to a point of contact with the base. As the bolt is tightened, the spreading between the female threaded member and the distal end of the bolt provides clamping contact with the base.

In highly preferred embodiments, the mounted member, in addition to being securable to the base in a working position, is securable to the base in a storage position. In such storage position, the second abutment surface is positioned away from the first abutment surface to expose the first abutment surface for contact with the bolster. Thus, when the mounted member is not being used to restrict the angle of oscillation of the axle, it may be stored in a position in which it is readily accessible for use by simple detachment and remounting to the base in its working position.

The mounted member preferably includes at least a pair of holes through it for receiving the screw means, one for securing the mounted member in the working position and the other for securing the mounted member in the storage position. Each such hole also preferably includes a recess to nonrotatably receive a female threaded member (nut) as described above. It has been found that a simple one-screw clamping attachment is quite adequate for mounting the mounted member to the base in either the storage position or the working position.

The base and the mounted member of the stop means are preferably configured in a manner facilitating clamping engagement of the mounted member to the base, and also preferably facilitating the dual-position engagement previously described.

The base, which as noted is preferably integrally formed with the axle housing, preferably includes a substantially horizontal portion and a substantially vertical portion. The horizontal portion forms the first abutment surface on its top and also has a bottom surface spaced above the main portion of the axle housing. The vertical portion extends from the main portion of the axle housing structure to the bottom surface of the horizontal portion. The horizontal portion and the vertical portion preferably have coplanar inward edges which form a T-shaped surface.

The mounted member is slotted for insertion onto such T-shaped inward edges. The mounted member preferably has horizontal and vertical slots which cross each other to receive such T-shaped edges.

More specifically, the mounted member includes major and minor vertically-offset portions forming a horizontal slot in which the horizontal portion of the base is received when the mounted member is secured to the base in the working position. The major vertically-offset portion forms the second abutment surface.

The mounted member further includes a vertical slot dividing each of the major and minor vertically offset portions into two arms. When the mounted member is secured in its working position, the two arms of the minor offset portion extend on either side of the vertical portion of the base at a position just below the bottom surface of the horizontal portion of the base. When the mounted member is secured in its storage position, the two arms of the major offset portion extend on either side of the vertical portion of the base at the same position. The vertical slot divides the second abutment surface into two portions, preferably mirror images of each other.

In such preferred form, the mounted member preferably includes a pair of holes for receiving screw means to secure the mounted member to the base. One of such holes is through the minor offset portion for receiving a bolt such that its distal end engages the bottom surface of the horizontal member to secure the mounted member in the working position. The other hole, through one of the arms in the major offset portion, is for receiving a bolt (for example, the same bolt) such that its distal end engages the vertical portion of the base to secure the mounted member in the storage position.

The first and second abutment surfaces are generally similar to one another (although the second abutment surface may be divided by a slot) and substantially-identically oriented at the point of their separate engagements with the bolster. More specifically, just as the abutment surface of certain axle stops of the prior art engage the bolster in full face-to face fashion in order to minimize surface wear, both the first and second abutment surfaces engage the bolster in face-to-face fashion.

Such first and second abutment surfaces are preferably planar, that is, they have substantial flat portions. In such cases, the flat portions of the first and second abutment surfaces are angled with respect to each other when the mounted member is in its working position on the base. The angle between such two planes is equal to the angle of restriction of the oscillation imposed by the mounted member. For example, if the normal angle of oscillation of the axle is twelve degrees above horizontal when the mounted member is not in the working position, and six degrees when the mounted member is in the working position, then such angle between the flat portions of such first and second abutment surfaces would be approximately six degrees.

Other abutment surface characteristics are possible. However, face-to-face engagement is highly preferred, whether such surfaces are curved or flat.

BRIEF DESCRIPTION OF THE DRAWINGS

FIG. 3 is a partially cut-away enlarged front elevation of the right mounted member shown in FIG. 1.

FIG. 4 is a top view of FIG. 3.

FIG. 5 is a bottom view of FIG. 3.

FIG. 6 is a right side view of FIG. 3.

DETAILED DESCRIPTIONS OF PREFERRED EMBODIMENTS

Figure 1:
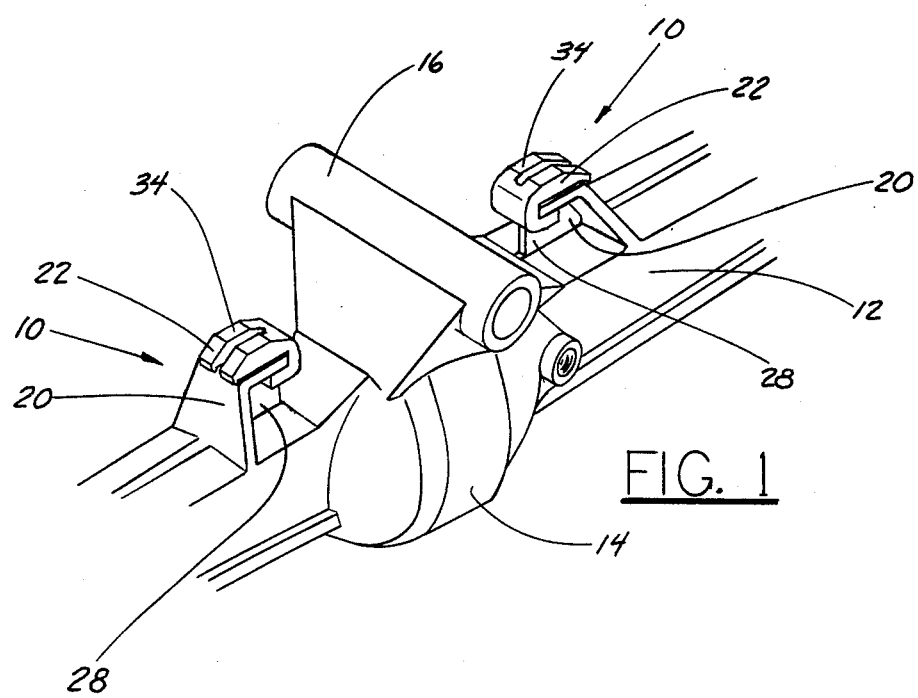
FIG. 1 is a fragmentary perspective view of a tractor front axle, illustrating the tractor oscillation stops of this invention.
Figure 2:
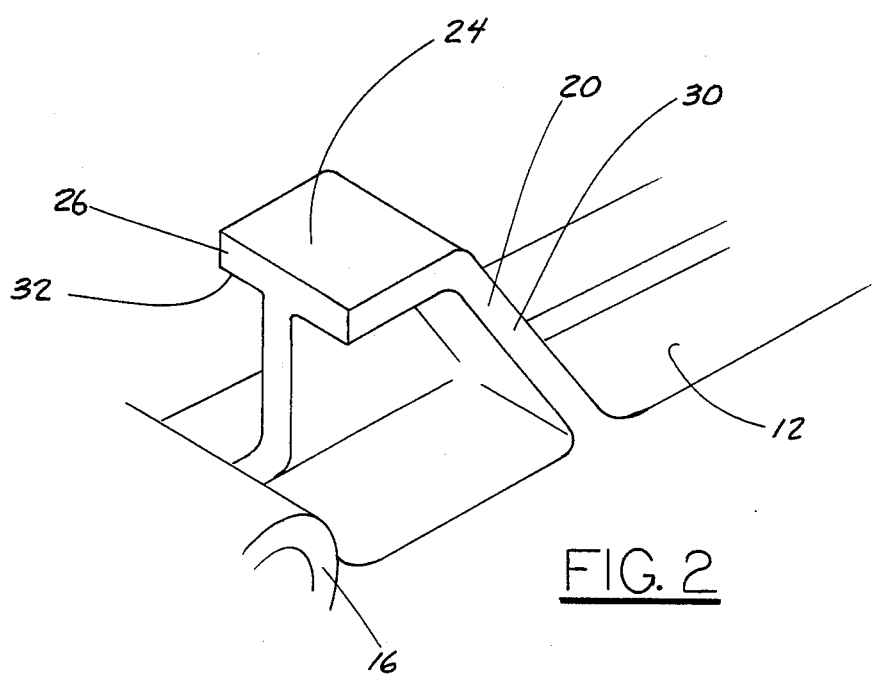
FIG. 2 is an enlarged view of a portion of one of the stops shown in FIG. 1, but having the mounted member removed.

FIG. 1 shows a pair of axle oscillation stops 10 on a tractor front axle housing 12, one on either side of a gear housing 14 which forms a portion of axle housing 12. The tractor front axle structure also includes a pivot mount member 16 by which axle housing 12 is pivotably attached to the remainder of the tractor. Each of the oscillation stops 10 is positioned to abut a bolster 18 (see FIGS. 7 and 8), which is in fixed position on the tractor above axle housing 12, when the axle pivots too far about pivot mount member 16.

Each oscillation stop 10 includes a base 20 and a mounted member 22. Base 20 is removably mounted on base 20 in one of two different positions—either a working position (see FIG. 7) or a storage position (see FIG. 8).

Base 20 is integrally formed with the main portion of front axle housing 12 and projects upwardly from the main portion of front axle housing 12 to terminate in a first top abutment surface 24. Base 20 includes a horizontal portion 26 on which first top abutment surface 24 is formed, a vertical portion 28, and an outside portion 30. Horizontal portion 26 has a bottom surface 32 and vertical portion 28 extends from the main portion of axle housing 12 to bottom surface 32. Outside portion 30 also extends from the main portion of front axle housing 12 to horizontal portion 26 and is connected to vertical portion 28 along its length. This structure, known in the prior art, provides good strength for base 20.

Mounted member 22 has a second top abutment surface 23 which, when mounted member 22 is secured to the base in its working position, is positioned above first top abutment surface 24. Thus, when mounted member is in its working position second abutment surface 34 serves to restrict the maximum oscillation of the axle more than first abutment surface 24.

As best illustrated in FIGS. 3-6, mounted member 22 includes major and minor vertically-offset portions 36 and 38, respectively. Major and minor offset portions 36 and 38 form a horizontal slot 40 therebetween into which horizontal portion 26 of base 20 is received when mounted member 22 is secured to base 20 in its working position. Second top abutment surface 34 is formed on major offset portion 36.

Figure 7:
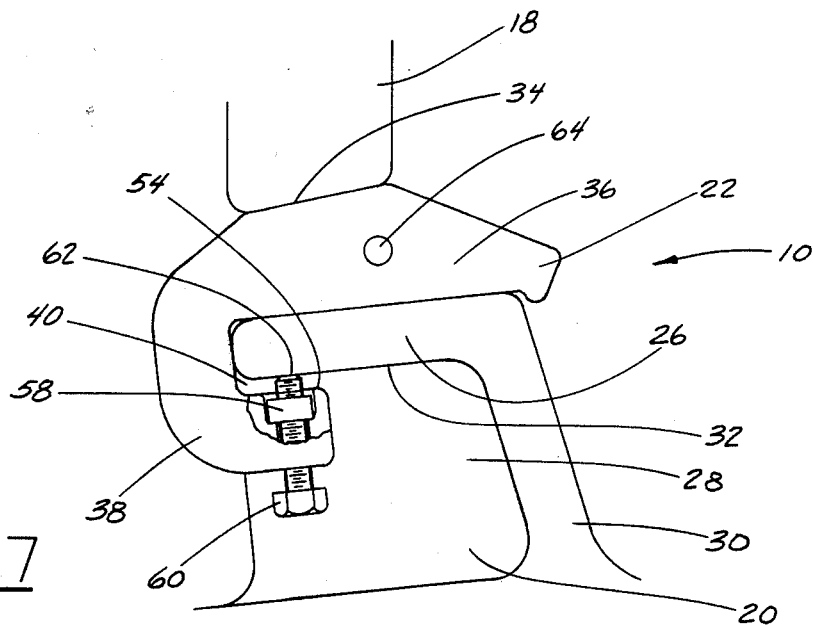
FIG. 7 is a front elevation as in FIG. 3, but showing the mounted member in working position and in engagement with a bolster.
Figure 8:
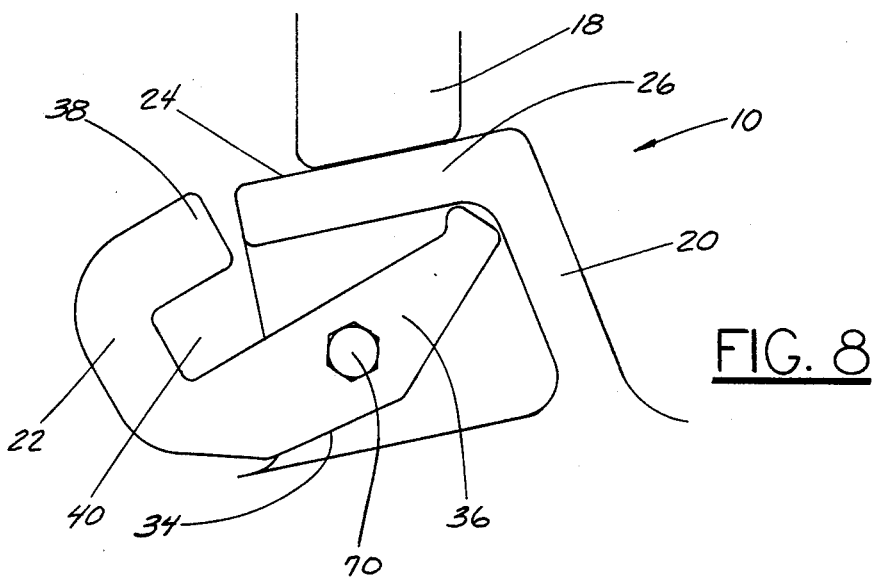
FIG. 8 is similar to FIG. 7, but illustrates the mounted member in its storage position.

Mounted member 22 also includes a vertical slot 42 which divides major offset portion 36 into two arms 44 and 46 and minor offset portion 38 into two arms 48 and 50. Arms 48 and 50 of minor offset portion 38 extend on either side of vertical portion 28 when mounted member 22 is secured in its working position, as illustrated in FIG. 7. Arms 44 and 46 of major offset portion 36 extend on either side of vertical portion 28 of base 20 when mounted member 22 is secured in its storage position as illustrated in FIG. 8.

Mounted member 22 is secured to base 20 in either the working position or the storage position by means of a single bolt and nut combination.

As illustrated in FIGS. 3, 5, and 7, a pair of holes 52 extend vertically through arms 44 and 46 of minor offset portion 38. Arms 44 and 46 each have an inside surface 54 with a recess 56 to nonrotatably receive a nut 58 (see FIG. 7), which is threadedly engaged with a bolt 60. Nut 58 is preferably a square nut and recess 56 is preferably of square configuration to receive nut 58 nonrotatably. To engage mounted member 22 to base 20 in its working position, nut 58 is dropped into a recess 56 either on arm 44 or on arm 56 and bolt 60 is threaded therethrough. As bolt 60 is tightened, the distal end 62 of bolt 60 contacts bottom surface 32 of horizontal portion 26 of base 20. Further tightening clamps horizontal portion 26 between nut 58, the movement of which is restricted by recess 56, and major offset portion 36. In this way mounted member 22 is held securely in its working position.

Two bolt and nut combinations could be used, one through each of the arms 44 and 46, but one is sufficient. However, a pair of holes 52 and recesses 56 are preferably included so that mounted member 22 can be made in one form for either side of the axle, thus facilitating attachment to base 20 in the easiest manner.

Likewise, as illustrated in FIGS. 3, 4 and 8, a pair of holes 64 and corresponding recesses 66 extend horizontally through arms 48 and 50 of major offset portion 36. Recesses 66 are on the inside surfaces 68 of arms 48 and 50. A bolt 70, shown in FIG. 8 and a nut (not shown) cooperate in the same manner as is described above with respect to bolt 60 and nut 58 to clamp mounting member 22 in place against vertical portion 28 of base 20. Only one bolt is used, but two pairs of holes 64 and recesses 66 are available for convenience and for use on either side of the axle midpoint.

As best illustrated in FIG. 8, when mounted member 22 is in its storage position, second abutment surface 34 is well below horizontal portion 26, positioned well out of the way to fully expose first abutment surface 24 for contact with bolster 18 as required. Storage at this position assures that mounted member 22 will be available and will be accessible when it is desirable to further restrict the oscillatory movement of front axle housing 12.

First top abutment surface 24 is flat and second top abutment surface 34 is also flat. Second top abutment surface is divided into two portions by vertical slot 42 (see FIGS. 4 and 6). Nevertheless, when first and second abutment surfaces 24 and 34 are at the point of their separate engagements with bolster 18, they have substantial portions which are similar and identically-oriented so that they each engage bolster 18 in face-to-face fashion.

As best illustrated in FIGS. 3, 7 and 8, second abutment surface 34 is angled with respect to first abutment surface 24. Such angle is equal to the further limitation in the angle of oscillation which is imposed by mounted member 22 when it is in its working position.

Mounted member 22 may be moved from its storage position, illustrated in FIG. 8, to its working position, illustrated in FIG. 7, by loosening bolt 70, slipping mounted member 22 off base 20, inverting mounted member 22, taking the nut which was removed from bolt 70 and inserting it in one of the recesses 56 and engaging the same bolt with it, sliding mounted member 22 into full engagement with base 20, and tightening the bolt. Moving mounted member 22 from the working position to the storage position involves the same sorts of steps.

While the principles of this invention have been described in connection with specific embodiments, it should be understood clearly that these descriptions are made only by way of example and are not intended to limit the scope of the invention.

What is claimed:

1. In a tractor of the type having a tractor body, an axle tiltable about a center point with respect to the tractor body, and means on either side of the center point for limiting the range of axle tilting, the improvement wherein each limiting means comprises:
    a fixed bolster secured to the tractor body in position above the axle;
    a base fixed with respect to the axle, projecting upwardly therefrom, and having a first top abutment surface vertically aligned with and engagable with the bolster; and
    a mounted member removably securable to the base in a working position and having a second top abutment surface which is above the first top abutment surface when the mounted member is in the working position,
whereby the second abutment surface restricts oscillation of the axle more than the first abutment surface.

2. The device of claim 1 further comprising means mounted member for removably securing the mounted member to the base.

3. The device of claim 2 wherein the securing means comprises screw means extending through the mounted member and having a distal end contacting the base.

4. The device of claim 3 wherein the mounted member includes a recess to non-rotatably receive a female threaded member and the screw means includes a male threaded member engaging the female threaded member to provide clamping contact with the base.

5. The device of claim 2 wherein the mounted member is also securable to the base in a storage position in which the second abutment surface is positioned to expose the first abutment surface.

6. The device of claim 5 wherein the mounted member includes at least a pair of holes for receiving the screw means, one for securing the mounted member in the working position and the other for securing the mounted member in the storage position.

7. The device of claim 1 wherein substantial portions of the first and second abutment surfaces are substantially similar and substantially-identically oriented at the point of their separate engagements with the bolster.

8. The device of claim 7 wherein the first and second abutment surfaces have substantial flat portions, said portions being angled with respect to each other when the mounted member is in the working position, such angle being equal to the angle of oscillation restriction imposed by the mounted member.

9. The device of claim 1 wherein:
the base includes a substantially horizontal portion forming the first abutment surface and having a bottom surface, and a substantially vertical portion extending from the axle structure to the bottom surface of the horizontal portion; and
the mounted member includes major and minor verticallyoffset portions forming a horizontal slot in which the horizontal portion of the base is received when the mounted member is secured to the base in the working position, the major vertically-offset portion forming the second abutment surface.

10. The device of claim 9 further comprising means on the mounted member for removably securing the mounted member to the base.

11. The device of claim 10 wherein the securing means comprises screw means extending through the mounted member and having a distal end contacting the bottom surface of the horizontal member of the base.

12. The device of claim 11 wherein the mounted member includes at least a pair of holes for receiving the screw means, one for securing the mounted member in the working position and the other for securing the mounted member in the storage position.

13. The device of claim 9 wherein the mounted member is also securable to the base in a storage position in which the second abutment surface is positioned to expose the first abutment surface.

14. In a stop means on a tractor axle for limiting axle oscillation of the type including an upwardly-projecting stop on the axle structure in position to engage a bolster which is in fixed position on the tractor above the axle, the improvement wherein the stop comprises:
a base fixed with respect to the axle, projecting upwardly therefrom, and having a substantially horizontal portion, which forms a first top abutment surface and has a bottom surface, and a substantially vertical portion extending from the axle structure to the bottom surface of the horizontal portion;
a mounted member selectively and removably securable to the base in either a working position or a storage position, the mounted member having a second top abutment surface which is positioned above the first top abutment surface when the mounted member is in the working position and positioned to expose the first top abutment surface when the mounted member is in the storage position, whereby the second abutment surface restricts oscillation of the axle more than the first abutment surface;
the mounted member having major and minor vertically offset portions forming a horizontal slot therebetween, the major vertically offset portion forming the second top abutment surface; and
the mounted member also including a vertical slot dividing each of the major and minor offset portions into two arms, the two arms of the minor offset portion extending on either side of the vertical portion of the base when the mounted member is secured in its working position, and the two arms of the major offset portion extending on either side of the vertical portion of the base when the mounted member is secured in its storage position.

15. The device of claim 14 further comprising means on the mounted member for removably securing the mounted member to the base.

16. The device of claim 15 wherein the securing means comprises screw means extending through the mounted member and having a distal end contacting the base.

17. The device of claim 16 wherein the mounted member includes at least a pair of holes for receiving the screw means, one through the minor offset portion for receiving the screw means such that its distal end engages the bottom surface of the horizontal member to secure the mounted member in the working position, and the other through one of the arms for receiving the screw means such that its distal end engages the vertical portion of the base to secure the mounted member in the storage position.

18. The device of claim 17 wherein substantial portions of the first and second abutment surfaces are substantially similar and substantially-identically oriented at the point of their separate engagements with the bolster.

19. The device of claim 18 wherein the first and second abutment surfaces have substantial flat portions, said portions being angled with respect to each other when the mounted member is in the working position, such angle being equal to the angle of oscillation restriction imposed by the mounted member.

* * * * *

UNITED STATES PATENT AND TRADEMARK OFFICE
CERTIFICATE OF CORRECTION

PATENT NO. : 4,714,263

DATED : December 22, 1987

INVENTOR(S) : Donald C. Marek

It is certified that error appears in the above-identified patent and that said Letters Patent is hereby corrected as shown below:

Column 1, line 14 - change "infirm" to -- in firm --;

In claim 2 (column 6, line 64) - insert --  on the -- at the beginning of the line;

In claim 9 (column 7, lines 31 and 32) - change "verticallyoffset" to -- vertically-offset --.

Signed and Sealed this

Third Day of May, 1988

Attest:

Attesting Officer

DONALD J. QUIGG

Commissioner of Patents and Trademarks